United States Patent [19]
Carle et al.

[11] Patent Number: 5,169,523
[45] Date of Patent: Dec. 8, 1992

[54] FILTER PLATE FOR PRESSES FOR PRESSING COCOA PASTES

[75] Inventors: Enrico M. Carle; Marco G. Carle, both of Milan, Italy

[73] Assignee: Carle & Montanari, S.p.A., Italy

[21] Appl. No.: 681,804

[22] Filed: Apr. 5, 1991

[30] Foreign Application Priority Data

Apr. 6, 1990 [IT] Italy ................. 19962 A/90

[51] Int. Cl.⁵ ................. B01D 25/12; B30B 15/00
[52] U.S. Cl. ................. 210/231; 210/498; 100/125
[58] Field of Search ........... 210/231, 489, 498; 100/116, 125, 297

[56] References Cited

U.S. PATENT DOCUMENTS 4,684,466 8/1987 Terpstra ................. 210/489

FOREIGN PATENT DOCUMENTS 2696 of 1866 United Kingdom ............ 210/498

Primary Examiner—Mary Lynn Theisen
Assistant Examiner—Matthew O. Savage
Attorney, Agent, or Firm—Kirschstein, Ottinger, Israel & Schiffmiller

[57] ABSTRACT

A filter plate for use in a press for separating cocoa butter from cocoa paste includes a plate body having an inlet surface facing the paste, and an outlet surface in which a spiral collection channel is formed. A plurality of holes extends through the body between the inlet and outlet surfaces. The holes communicate with, and are spaced along, the spiral collection channel.

11 Claims, 3 Drawing Sheets

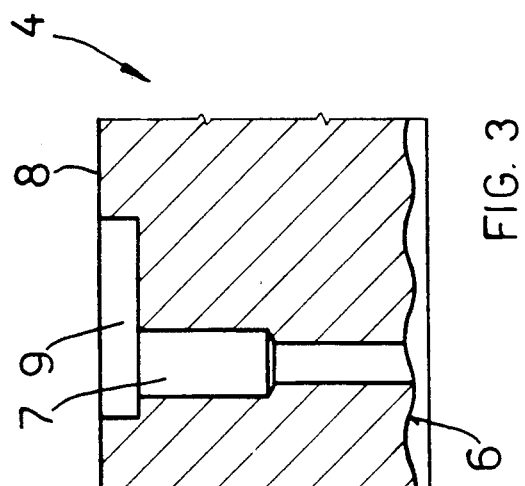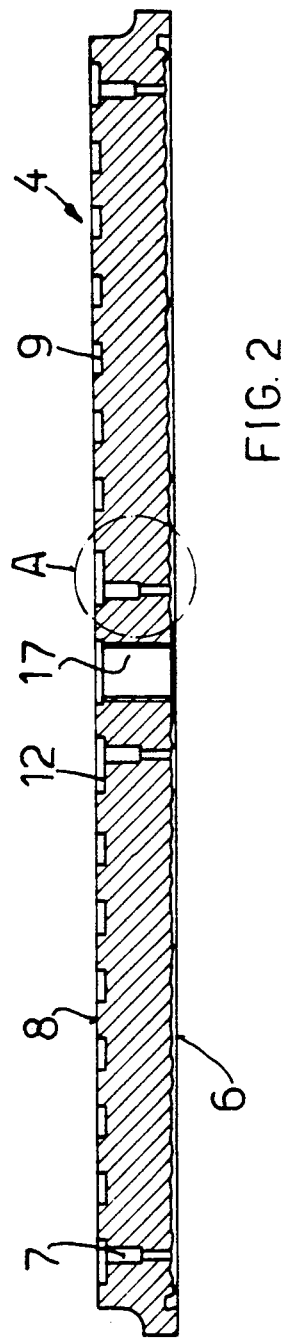

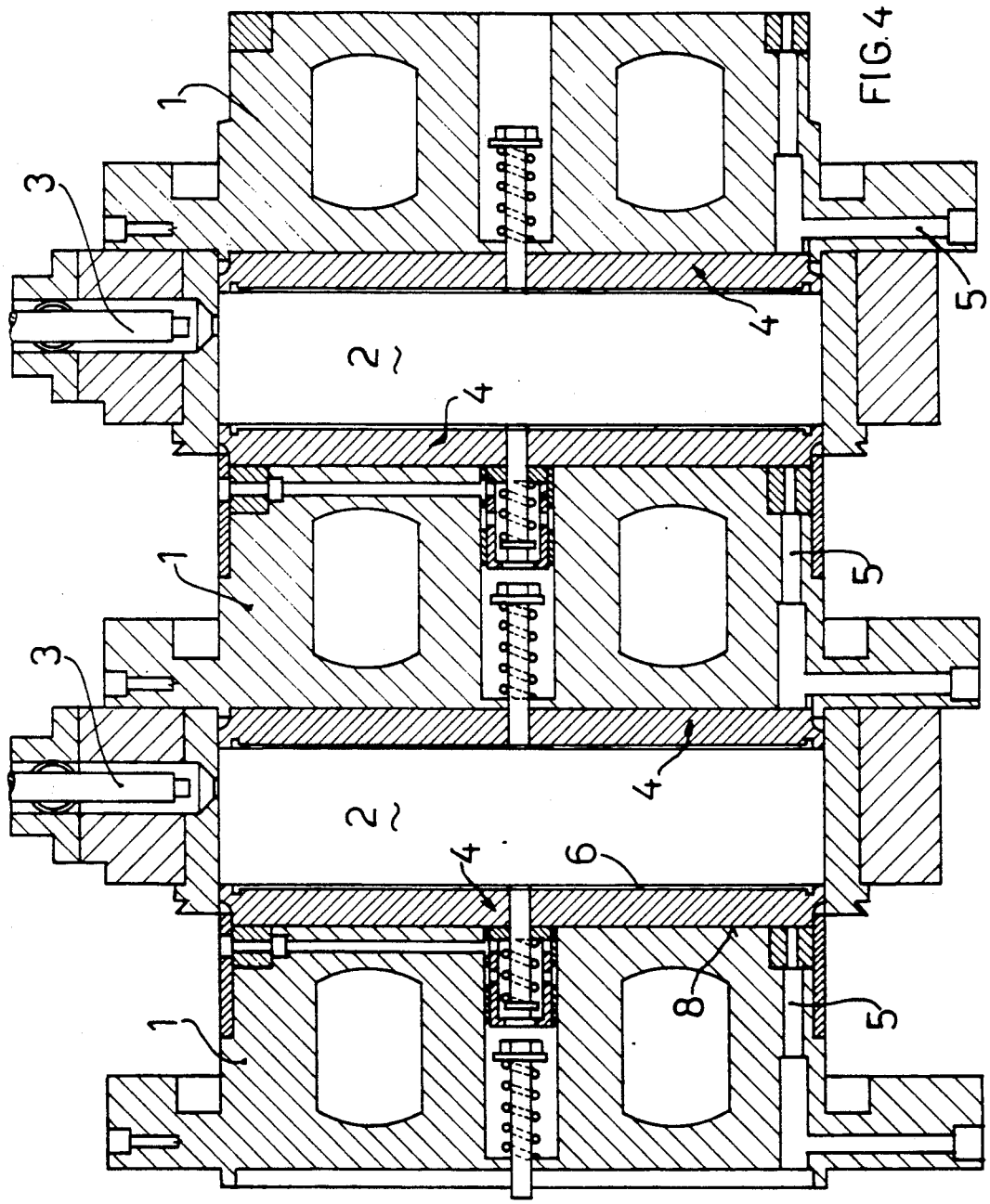

FILTER PLATE FOR PRESSES FOR PRESSING COCOA PASTES

BACKGROUND OF THE INVENTION

1. Field of the Invention

The present invention relates to a filter plate for presses for pressing cocoa pastes.

2. Description of Related Art

As is known, in the terminal stage of treatment of cocoa paste in the liquid state, separation is carried out of the liquid phase of cocoa butter from the solid phase in presses which have a number of reciprocally movable pistons and which bear, on the side turned towards the pressing chambers, a filter plate. Presses and filter plates of this type are known to the art.

Known filter plates accommodate, on the side turned towards the pressing chamber, a filter gauze of very fine mesh and have a plurality of through-holes opening into channels which are open on the side turned towards the associated piston. A number of concentric channels are provided, connected to a more external collecting discharge channel by means of a plurality of radial channels. It follows that the through-holes of the filter plates are likewise arranged according to concentric circumferences and radial lines. The collecting discharge channel faces with one of its sections a discharge hole for the cocoa butter made in the associated piston.

In the stage of pressing the cocoa pastes, it is important to achieve maximum anticipated extraction of the expensive cocoa butter and to carry out such extraction in the briefest possible time. In known filter plates, between the concentric channels and the radial channels of the through-holes, there is a plurality of blind annular sectors, that is to say without through-holes and of relatively large surface area.

These known filter plates have various disadvantages. Constructionally, the execution of the concentric channels and of the radial channels and of the high number of through-holes is costly. The residue of cocoa butter on the cake is distributed in zones in rather an irregular manner, which aggravates the measurement of the residual cocoa butter according to the relative standards. It is not possible to shorten the pressing times. At the end of the pressing stage, the presence of the blind circular sectors brings about in the cake the formation of pockets of deposit of cocoa butter which are difficult to evacuate. In these zones, upon the release of the oil-hydraulic pressing pressure, suction of cocoa butter is created which, from the through-holes of the filter plate, returns into the cake and thus contributes to creating on the cake zones with irregular distribution of cocoa butter. These non-uniform cakes then aggravate working in the pulverizing mill.

SUMMARY OF THE INVENTION

The aim of the invention is to produce a filter plate which is capable of allowing a more uniform pressing of the cocoa paste and a greater speed of evacuation of the cocoa butter, to eliminate the formation of the pockets of deposit of cocoa butter in the cake and to guarantee the cocoa butter residue is positioned on the cake, distributed in a uniform manner, in the presence of a greatly reduced number of holes in relation to known filter plates.

The aim is achieved with a filter plate of the type in question, which is characterized in that the through-holes open into a spiral channel arranged in the plane of distribution of the filter plate. Optimal exploitation of the circular surface area of the plate is achieved by virtue of the fact that the spiral channel starts in the central zone of the plate and ends without interruption in the vicinity of the external circumference of the plate in a collecting discharge channel.

Increased uniformity of pressing can be achieved according to the invention by virtue of the fact that the through-holes are distributed along the spiral channel with constant spacing.

The pressing times can be further reduced according to the invention by virtue of the fact that the spiral channel, into which the through-holes open, is provided with a number of spiral curves.

In the central zone of the plate, rapid and uniform dislocation of the filtered cocoa butter can be achieved by virtue of the fact that, in the case of spiral channels with a number of spiral curves, the start zones of the spirals are interconnected by an annular connection channel.

It is moreover possible to shorten further the pressing times by providing radial channels which connect the spiral channels and open into the collecting discharge channel.

According to the invention, particularly favorable pressing ratios are achieved by virtue of the fact that the spacing between the through-holes corresponds to the pitch of the spiral channel.

With the filter plate according to the invention, the following advantages are achieved: by reducing the pressing times, the efficiency of the press is increased; the plates according to the invention can also be used in presses which exist already; in the cakes discharged, the quantity of cocoa butter corresponds exactly to the low percentage set and the extraction yield of cocoa butter is thus increased. As a result of the uniform network formed by the through-holes, the cocoa butter residue is distributed on the cakes in a uniform manner. Constructionally, the plate can be made in a simple manner and the number of holes necessary is considerably smaller in relation to the holes of known filter plates. As a result of the lack or the limited number of radial discharge channels, the plates according to the invention can be heavily loaded with pressure.

BRIEF DESCRIPTION OF THE DRAWINGS

Further characteristics, advantages and details of the filter plate according to the invention will also emerge from the following description with reference to the attached drawings, in which a preferred embodiment is indicated.

FIG. 2 shows a cross-section according to the line II—II in FIG. 1;

FIG. 3 is a sectional view on an enlarged scale of the detail A in FIG. 2; and

FIG. 4 is a cross-section view through a known press for pressing cocoa pastes.

DETAILED DESCRIPTION OF THE PREFERRED EMBODIMENTS

Figure 1:
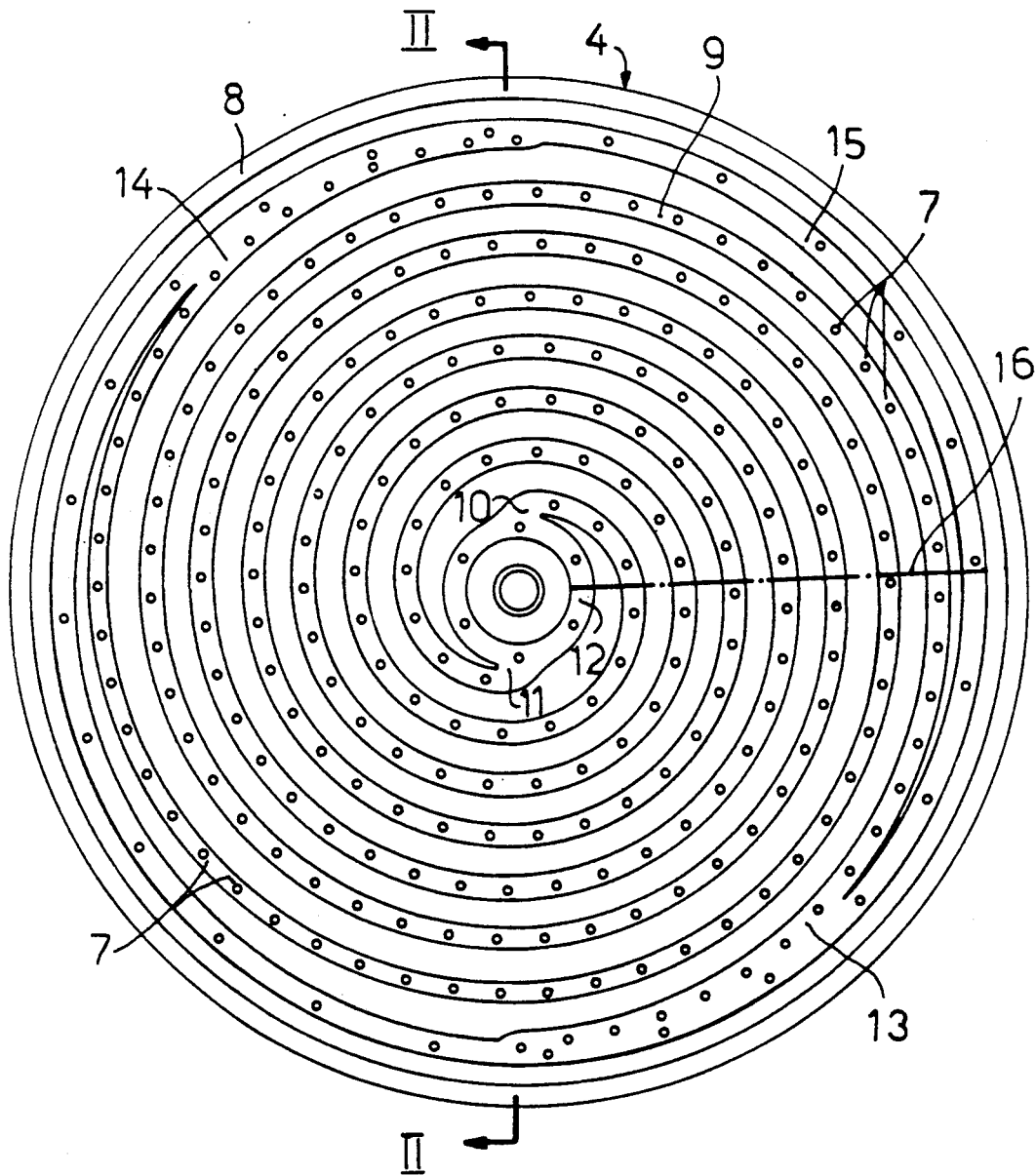
FIG. 1 shows a plan view of the filter plate according to the invention.

Firstly, the known press for pressing illustrated in FIG. 4 is briefly described below. In the same, 1 indicates three piston elements. In the illustrated position of opening of the lateral pistons 1, pressing chambers 2 are formed, into which the cocoa paste to be treated is introduced at 3. 4 indicates the filter plates which, on the filtration side which is turned towards the pressing chamber 2, have a filter gauze and, on the side or plane of distribution which is turned towards the associated piston 1, have concentric channels and radial channels, into which the through-holes open. The radial channels are connected to a more external collecting discharge channel, one section of which faces the discharge pipe 5 for the extracted cocoa butter.

Reference is now made to FIGS. 1-3 which illustrate the filter plate 4 according to the invention. On the filtration side of the plate, there is provided in known manner a lowered circular region 6 for accommodation of a filtering net (not illustrated). According to the invention, the through-holes 7 are provided along a spiral course and open, on the plane 8 of the plate 4 turned towards the associated piston, into a spiral channel 9. In the example illustrated, the spiral channel starts in the central zone of the plate and ends, in the region of the circumferentially external zone of the plate, in the region of the discharge port 5 in the pressing pistons 1. In the example illustrated, a spiral 9 with two spiral curves is shown, the starting zones 10, 11 of which open into an annular channel 12 and the end parts 13, 14 of which open tangentially into a collecting discharge channel 15. As can be seen from FIGS. 2 and 3, the through-holes 7 are provided, as known, with a small cross-section on the side of the filter gauze and with a larger cross-section in the part opening into the spiral channel 9.

As can be seen from the drawing, the spiral has constant pitch. According to an advantageous embodiment, the through-holes 7 also are distributed along the spiral channel with constant spacing. For the sake of simplicity in the drawing, the distribution of the through-holes 7 is not illustrated with rigorously constant spacing. The holes 7 may be spaced apart of one another at a spacing which is proportional to the radial distance between adjacent curves of the spiral channel 9. The advantageous characteristic of providing the spacing of the through-holes 7 to correspond preferably to the pitch of the spiral, as a result of which the holes 7 are arranged in the manner of a network with square mesh, is also not illustrated with rigorous accuracy, for the sake of simplicity. By providing a spiral with a number of spiral curves, length of the spiral channels is reduced.

By means of the network-type arrangement of the through-holes 7 on the pressing side, uniform pressing of the cocoa paste is brought about and the formation of the known pockets of cocoa butter is avoided, this fault being even more evident in so-called forced pressings.

By additionally providing a limited number of radial channels, which connect the turns of the spiral radially and open into the collecting discharge channel 15, it is possible further to reduce the pressing time. Such a radial channel is indicated diagrammatically by reference number 16.

Reference 17 indicates the central hole of the plate for the accommodation of the means of fixing the same, which are known per se and not illustrated further.

The functioning of the filter plate can be inferred from the description of the same and of the pressing press. The uniform distribution of the through-holes 7 on the surface of the plate 4 allows uniform, regular and rapid pressing of the cocoa butter with a consequent reduction in the pressing times. Dimensioning of the through-holes and of the spiral channel and of any radial channels, as well as of the transverse cross-section of the channels and the spacing of the through-holes, like the pitch of the spiral also, can be chosen freely according to the press and the paste to be pressed. By metering the pressing pressure, it is possible to set accurately the quantity of residual cocoa butter to be left on the cakes.

Although, for the sake of simplicity, reference has been made to cocoa pastes, the scope of the invention also includes the use of the proposed filter plates for the pressing of pastes of other seeds to be pressed for the extraction of their oil or fat content.

We claim:

1. A filter plate for use in a press for separating a liquid from a paste, comprising:
   a one-piece plate body having an inlet surface facing the paste, an outlet surface opposite to the inlet surface, a central region including a circular inner channel having a predetermined diameter, and an outer peripheral region including a circular outer channel having a diameter greater than said predetermined diameter,
   a spiral collection channel formed in the outlet surface and circling continuously from the central region in curves that constantly increase in size to the outer peripheral region, said spiral channel intersecting the inner channel at a start zone and intersecting the outer channel at an end zone, and
   a plurality of holes extending through the body from the inlet surface to the outlet surface, said holes being in open communication with, and spaced along the curves of, the spiral collection channel.

2. The filter plate according to claim 1, wherein the inlet surface has an annular seat.

3. The filter plate according to claim 1, wherein the body, the central region and the outer peripheral region are annular.

4. The filter plate according to claim 1; and further comprising an additional spiral collection channel formed in the outlet surface and circling continuously from the central region in curves that constantly increase in size to the outer peripheral region, said additional spiral channel intersecting the inner channel at a start zone and intersecting the outer channel at an end zone, said spiral channels lying in a common plane.

5. The filter plate according to claim 4, wherein the curves of the additional spiral channel are located between the curves of the first-mentioned spiral channel.

6. The filter plate according to claim 4, wherein both spiral channels extend circumferentially in a common direction about an axis perpendicular to the plate body.

7. The filter plate according to claim 4, wherein both start zones are spaced angularly apart of each other, and wherein both end zones are spaced angularly apart of each other.

8. The filter plate according to claim 1, wherein the holes are spaced apart of one another at a constant spacing.

9. The filter plate according to claim 1, wherein the holes are spaced apart of one another at a spacing which is proportional to the radial distance between adjacent curves of the spiral collection channel.

10. The filter plate according to claim 1, and further comprising a radial channel extending radially from the central region across the curves of the spiral collection channel to the outer peripheral region.

11. The filter plate according to claim 1, wherein each hole includes a first region having a predetermined cross-section, and a second region having a cross-section larger than said predetermined cross-section, and wherein the first region extends from the inlet surface to the second region, and wherein the second region extends from the first region to the outlet surface.

* * * * *